United States Patent [19]

Rupprecht

[11] Patent Number: 4,640,085
[45] Date of Patent: Feb. 3, 1987

[54] HARVESTER THRESHER

[75] Inventor: Karl Rupprecht, Hilter, Fed. Rep. of Germany

[73] Assignee: Claas Ohg, Harsewinkel, Fed. Rep. of Germany

[21] Appl. No.: 694,646

[22] Filed: Jan. 24, 1985

[30] Foreign Application Priority Data

Feb. 24, 1984 [DE] Fed. Rep. of Germany ....... 3406696

[51] Int. Cl.⁴ ..................... A01D 57/00; A01D 47/00; A01D 45/00
[52] U.S. Cl. ......................................... 56/14.6; 56/208
[58] Field of Search ...................... 56/14.4, 14.5, 14.6, 56/208, 209

[56] References Cited

U.S. PATENT DOCUMENTS

| 1,141,855 | 6/1915 | Wedell | 56/208 |
| 2,509,357 | 5/1950 | Krause | 56/208 |
| 2,509,371 | 5/1950 | Schroeppel | 56/208 |
| 3,431,711 | 3/1969 | Claas | 56/14.5 |
| 3,537,243 | 11/1970 | Bichel | 56/14.6 |
| 3,913,303 | 10/1975 | Blake et al. | 56/14.6 |
| 3,973,380 | 8/1976 | Knollman et al. | 56/14.6 |
| 4,108,150 | 8/1978 | Shaura | 56/14.6 |

Primary Examiner—Paul J. Hirsch
Attorney, Agent, or Firm—Michael J. Striker

[57] ABSTRACT

A drawing channel for a harvester thresher is provided for increasing its torsion strength, with a plurality of reinforcing frames which are distributed over the length of the channel and surround its cross-section and also with additional reinforcing sheets associated with lateral walls of the channel in the region of its turning axle so as to form hollow double walls.

2 Claims, 5 Drawing Figures

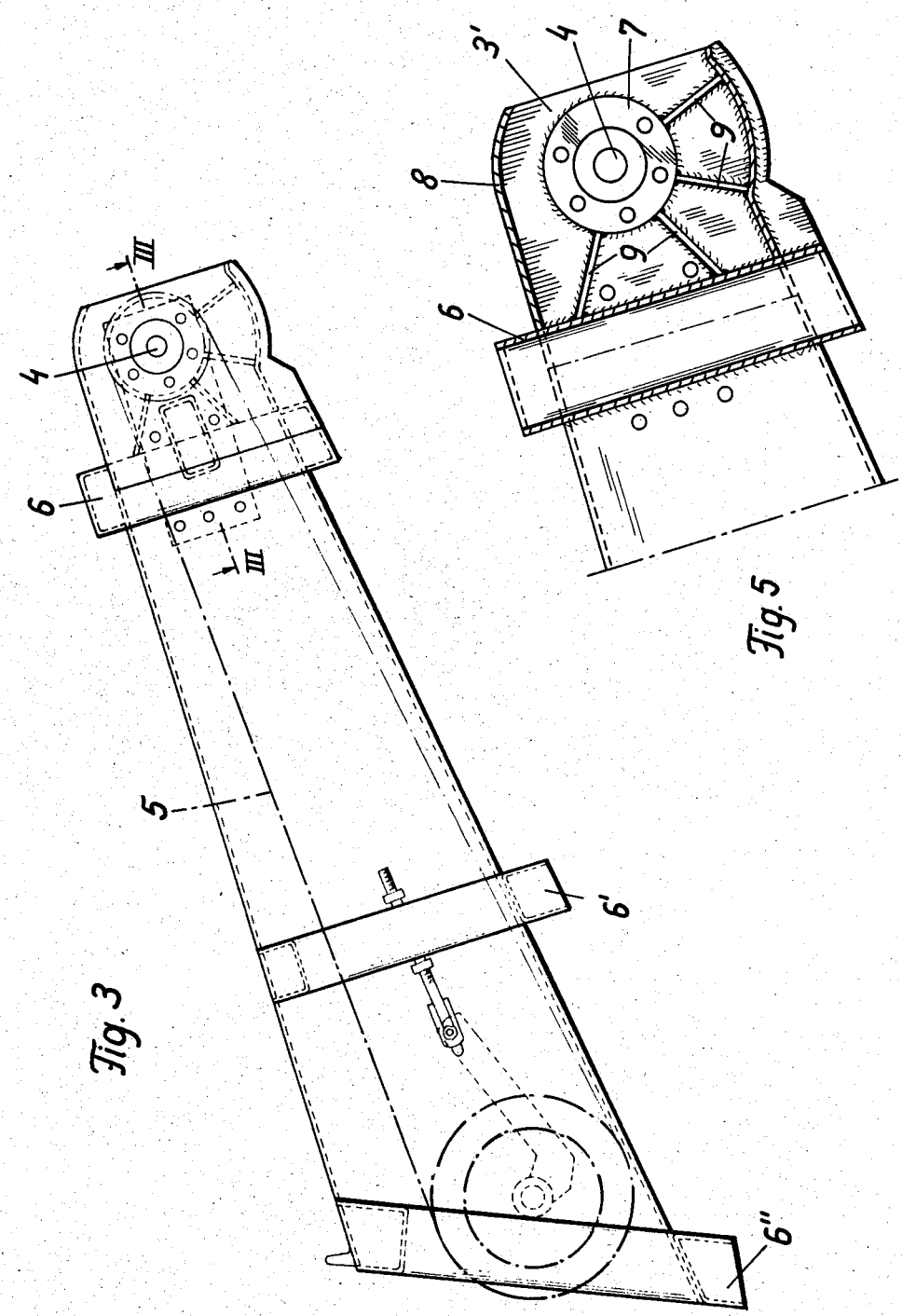

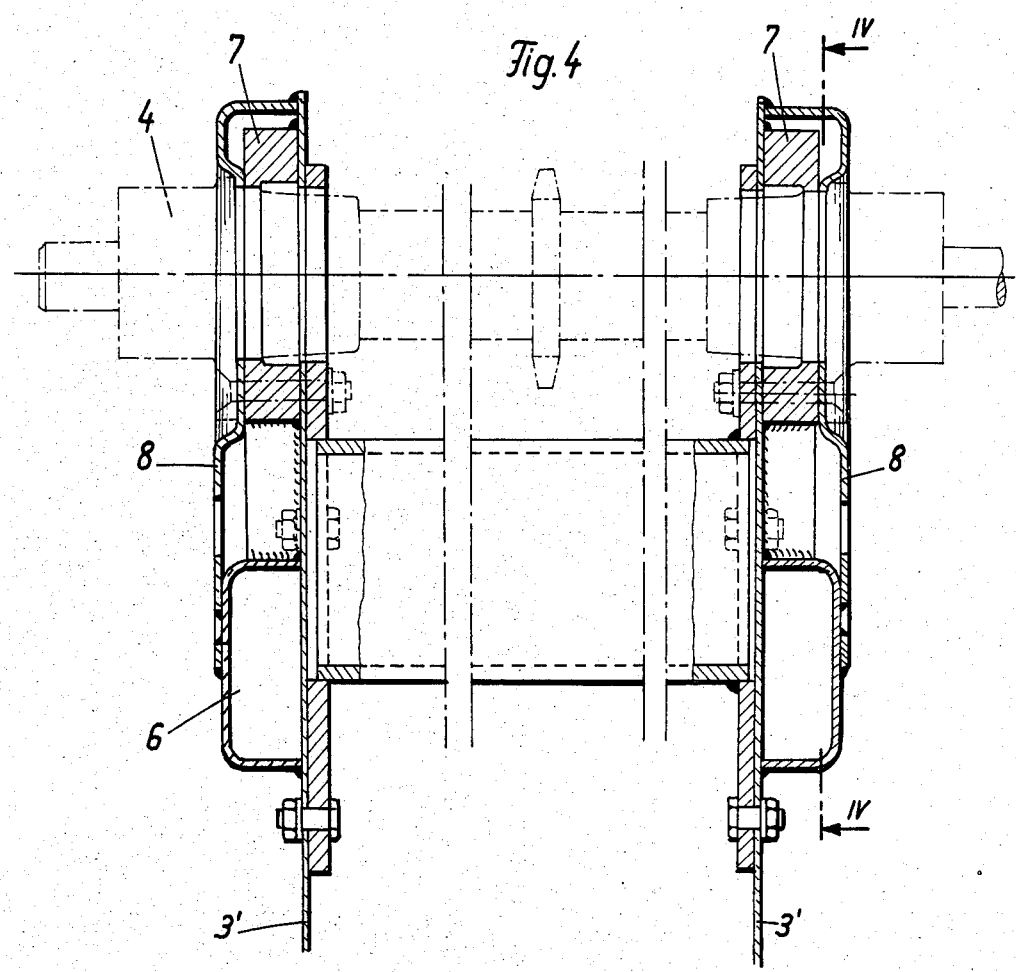

HARVESTER THRESHER

BACKGROUND OF THE INVENTION

The present invention relates to a drawing channel for a harvester thresher. More particularly, it relates to a drawing channel which is turnably connected at its one end via a turning axle with a machine frame and carries at its other end a cutting mechanism or a corn picker.

With tendency to have bigger and more effective harvester threshers, also the working width of cutting mechanisms and corn pickers is becoming greater. As a result of this, a increased loading of a drawing channel which carries the cutting mechanism or the corn picker takes place. Especially severe problems are connected with the required torsion strength of the drawing channel. The known drawing channels of the harvester threshers are not completely satisfactory in this respect.

SUMMARY OF THE INVENTION

Accordingly, it is an object of the present invention to provide a drawing channel of a harvester thresher which avoids the disadvantages of the prior art.

More particularly, it is an object of the present invention to provide a drawing channel for a harvester thresher which is improved in the sense of taking up a high loading of the drawing channel by a cutting mechanism or a corn picker.

In keeping with these objects and with others which will become apparent hereinafter, one feature of the present invention resides, briefly stated, in a drawing channel for a harvester thresher, which is provided with a plurality of reinforcing frames which are distributed over the length and surround the cross-section of the channel, and lateral walls of the channel in the region of the turning axle are provided with additional reinforcing sheets so as to form double walls.

When the drawing channel of the harvester thresher is designed in accordance with the present invention, it avoids the disadvantages of the prior art and attains the listed objects.

In accordance with another feature of the present invention, the additional reinforcing sheet is formed as a shaped member which is fixedly connected at its one end directly with the lateral walls and at its other end with the outer side of the reinforcing frame which is closest to the turning axle.

Still another feature of the present invention is that in the region of openings for the turning axle, in a hollow space between the lateral walls and the reinforcing sheet, spacing rings are arranged which are fixedly connected both with the lateral walls and with the reinforcing sheets.

A further feature of the present invention is that additional reinforcing ribs are arranged between the lateral walls and the reinforcing sheets in a ray-like manner, extending from the spacing rings, wherein the spacing rings, the lateral walls, the reinforcing sheets, and the reinforcing frames are connected with one another.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWING

FIG. 3 is a side view of the drawing channel in accordance with the present invention;

FIG. 4 is a view showing a section of the inventive drawing channel, taken alone the line III—III in FIG. 3; and FIG. 5 is a view showing a section of the inventive drawing channel, taken along the line IV—IV in FIG. 4.

DESCRIPTION OF THE PREFERRED EMBODIMENTS

Figure 1:
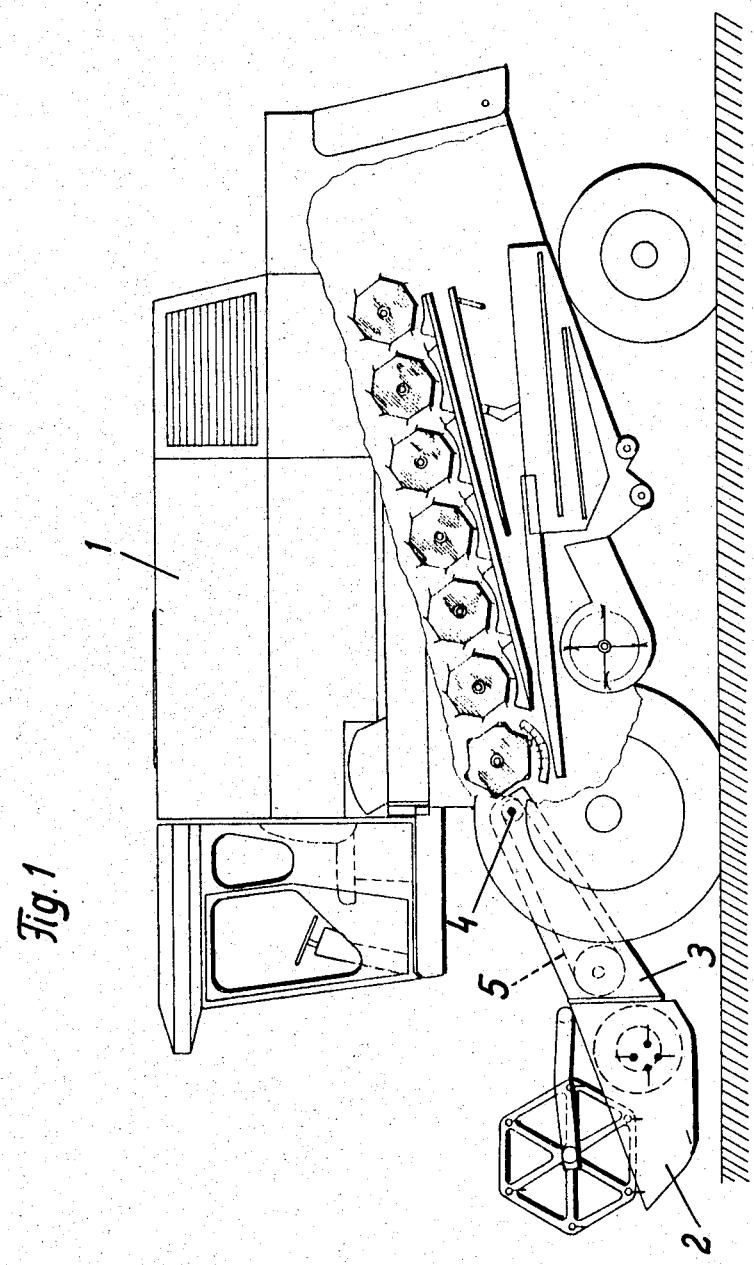
FIG. 1 is a schematic view showing a harvester thresher with a drawing channel and a cutting mechanism.
Figure 2:
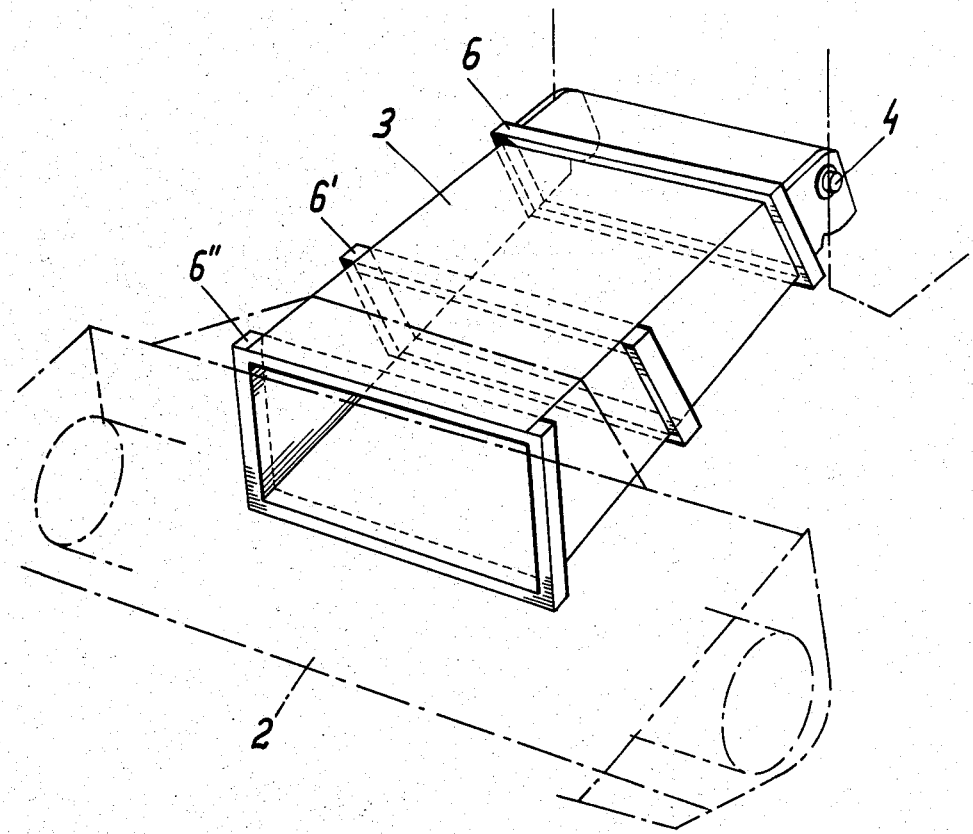
FIG. 2 is a perspective view of the drawing channel in accordance with the applicant's invention.

A harvester thresher in which a drawing channel in accordance with the present invention is used, is identified as a whole with reference numeral 1. The drawing channel is identified with reference numeral 3 and has one end which carries a cutting mechanism 2. The drawing channel 3 has a substantially rectangular cross-section. It is connected with its other end which is spaced from the cutting mechanism 2 with a turning axle 4. The drawing channel 3 connects the cutting mechanism 2, with a machine frame and is turnable about the turning axle 4. A band conveyor 5 is located inside the drawing channel 3.

A plurality of reinforcing frames 6, 6' and 6" are further provided. The reinforcing frames 6, 6' and 6" are distributed over the length of the drawing channel 3 at predetermined distances from one another. The reinforcing frames 6, 6' and 6" surround the cross-section of the drawing channel. More particularly, they surround from outside channel walls 3' which form the drawing channel 3.

In the region of the articulated connection of the drawing channel 3 with the machine frame, the drawing channel is formed double-walled in the following manner. Reinforcing sheets 8 are arranged in the above-mentioned region and outwardly spaced from the channel walls 3' so as to form a hollow space therebetween. Spacing rings 7 are located in the hollow spaces between the channel walls 3' and the reinforcing sheets 8 in the area in which the turning axle 4 extends through the channel walls 3. The spacing rings 7 are arranged at the outer side of the channel walls 3' and connected with the latter by welding.

The reinforcing sheets 8 are formed as corrugated shaped members. Each reinforcing sheet 8 has one end connected with the respective channel wall 3', the other end connected with the reinforcing frame 6 located closer to the turning axle 4, and a central part connected with the ring 7. These connections are performed also by welding. In this manner the above-mentioned locally limited double wall is provided in the drawing channel 3.

Reinforcing ribs 9 are further provided in the region of the turning axle 4 for increasing of torsional strength. The reinforcing ribs 9 extend in a ray-like manner from the spacing rings 7 and connect with one another the spacing rings 7, the channel walls 3', the reinforcing sheets 8, and the reinforcing frames 6.

The thus designed drawing channel for a harvester thresher has a very high strength to withstand the high loadings from the cutting mechanism or corn picker carried by the drawing channel.

It will be understood that each of the elements described above, or two or more together, may also find a useful application in other types of constructions differing from the types described above.

While the invention has been illustrated and described as embodied in a drawing channel for harvester thresher, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

1. In a self-propelling harvester thresher comprising a machine frame and a drawing channel pivotally connected to the machine frame at a pivot axis, said drawing channel carrying at a free end thereof a cutting mechanism or a corn picker, the improvement comprising said drawing channel having an elongated hollow body carrying a plurality of reinforcing frames surrounding said body and spaced from each other along the length of said body, said body having side walls which are provided in the region of said pivot axis with additional reinforcing walls so that said side walls are in said region double-walled, whereby torsional strength of the pivotable drawing channel is substantially increased, said channel also including spacing rings each positioned in a hollow space between a respective side wall and a respective additional reinforcing wall in the region of said pivot axis and rigidly connected to said side walls and said additional reinforcing walls, said channel also including reinforcing ribs extending in a ray-like manner from said spacing rings and connecting to each other said spacing rings, said side walls, said additional reinforcing walls and an adjacent one of said reinforcing frames.

2. The harvester thresher as defined in claim 1, wherein said additional reinforcing walls are shaped parts which at one ends thereof are immediately connected to said side walls and at the other ends thereof are rigidly connected to upper ends of said reinforcing frames.

* * * * *